United States Patent [19]

Whisler

[11] 3,967,859

[45] July 6, 1976

[54] VANDAL LATCH FOR PREVENTING REMOVAL OF A POP-OUT TYPE VEHICLE WINDOW

[75] Inventor: Edwin Lee Whisler, Peosta, Iowa

[73] Assignee: Deere & Company, Moline, Ill.

[22] Filed: May 5, 1975

[21] Appl. No.: 574,582

[52] U.S. Cl. .............................. 296/28 C; 49/141; 180/89 R
[51] Int. Cl.² ........................................ B62D 25/00
[58] Field of Search ............... 296/28 C, 28 R, 146, 296/65 R; 70/211, 212; 292/338, 259, DIG.15, 20, 23, 65; 180/114, 112, 82 R, 89 R; 49/141

[56] References Cited
UNITED STATES PATENTS

| | | | |
|---|---|---|---|
| 1,448,658 | 3/1923 | Furber | 70/211 |
| 1,569,168 | 1/1926 | Baxter et al. | 296/28 C X |
| 3,348,391 | 10/1967 | Barnwell | 70/211 |

Primary Examiner—L. J. Paperner
Assistant Examiner—Donald W. Underwood

[57] ABSTRACT

A vehicle cab includes a window designed to be removed from its framework so as to permit the egress of an operator in the event that the vehicle is involved in an accident and other cab exits are blocked. The inside of the window is provided with a latch comprising a bar mounted in the cab for movement between a stored position adjacent the window and out of engagement with a latch pin fixed to framework within the cab and a latched position wherein a notch located in the bar receives the pin, the latching bar then extending to a position requiring the back of the operator's seat to be pivoted forwardly to remind the operator to unlatch the window once he enters the cab to operate the vehicle.

4 Claims, 5 Drawing Figures

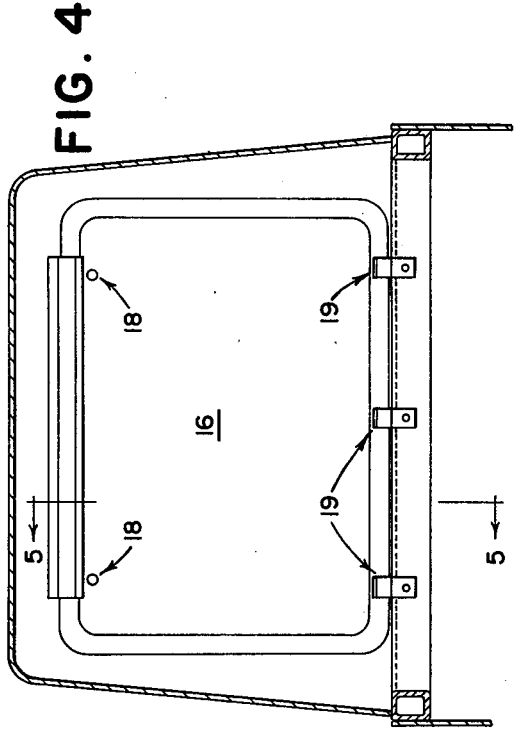
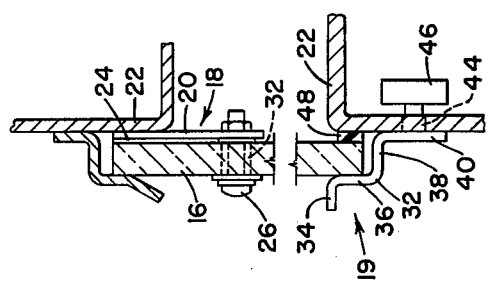
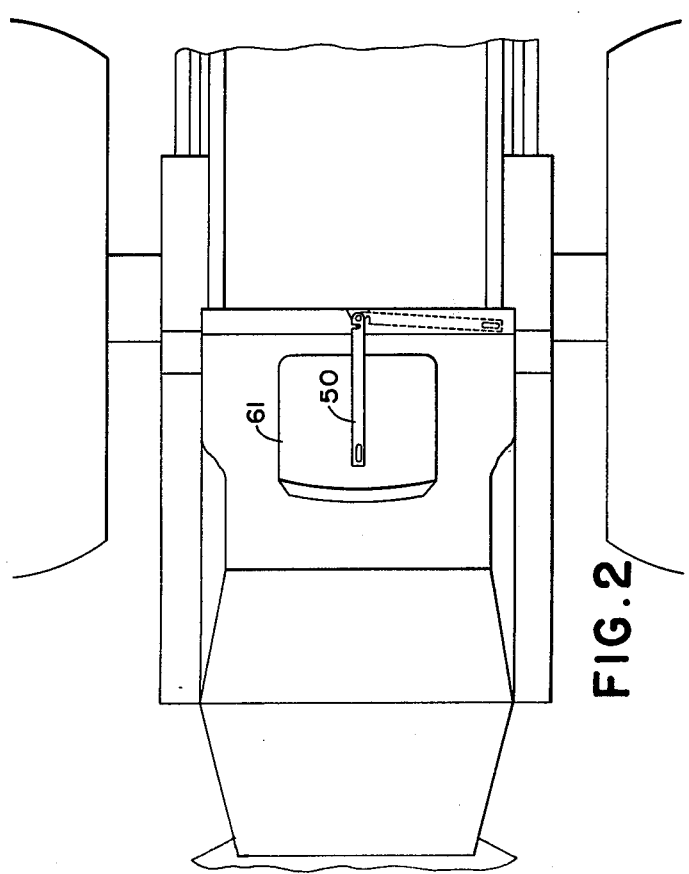
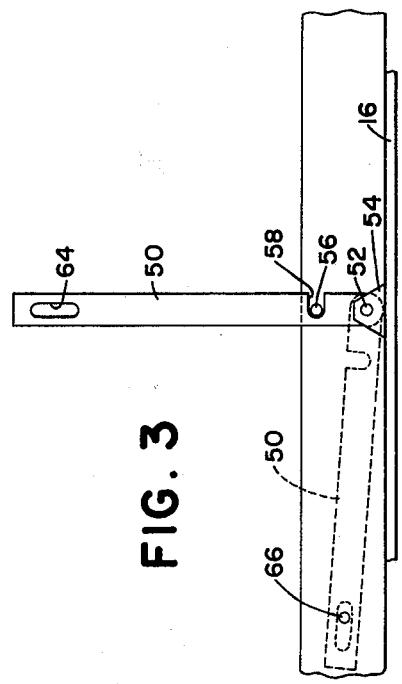

VANDAL LATCH FOR PREVENTING REMOVAL OF A POP-OUT TYPE VEHICLE WINDOW

BACKGROUND OF THE INVENTION

The present invention relates to a vandal latch and more particularly relates to a latch for retaining a "pop-out" type window in a vehicle cab when the vehicle is not in use.

Vehicles are often used in environments where it is desired to have the operator work within an enclosed cab having windows which are not designed to be opened lest the operator open them and subject himself to the hazard of being struck by foreign objects which might find their way through the window opening during operation of the vehicle. One problem attendant with such cab constructions is that in the event of an upset or collision or the like, the doors to the cab may become jammed making it difficult for an operator to leave the cab or for someone to rescue an injured operator in the cab.

It is known in the art to provide vehicles with windows which may be easily removed from their framework in order to permit rescue of an operator from the cab when the doors thereof become so damaged that the operator or rescuer cannot open them. However, cabs having such windows are subject to a further problem since it is possible for vandals to remove the windows thereof and gain access to the interior of the cab.

SUMMARY OF THE INVENTION

According to the present invention, there is provided means for securing a "pop-out" type window in place so that it may not be removed by vandals when the vehicle employing the cab is not in use.

It is an object of the invention to provide a vehicle cab with a virtually unbreakable window mounted so as to be easily removed from its casing to gain access to the inside of a cab for the purpose of rescuing an operator trapped therein and to provide latch means for selectively latching the window in place so as to prevent the cab from being entered by unauthorized persons when the vehicle is not in use.

A more specific object is to provide a cab having a latch mechanism as described in the preceding paragraph wherein the mechanism includes a latch member which, when positioned so as to effect latching of the window, extends such as to make the operator's seat unusable so as to remind the operator that he must unlatch the window before beginning operation of the vehicle.

These and other objects will become apparent from a reading of the following description in conjunction with the appended drawings.

BRIEF DESCRIPTION OF THE DRAWINGS

FIG. 2 is a top plan view of a part of the vehicle shown in FIG. 1 again with portions broken away and respectively showing the latch mechanism in its stored and operative positions in dashed and solid lines.

FIG. 3 is an enlarged view of the latch mechanism as it appears in FIG. 2.

FIG. 4 is an enlarged sectional view taken along line 4—4 of FIG. 2.

FIG. 5 is an enlarged sectional view taken along line 5—5 of FIG. 4 showing the structure connecting the window to the cab frame.

DESCRIPTION OF THE PREFERRED EMBODIMENT

Figure 1:
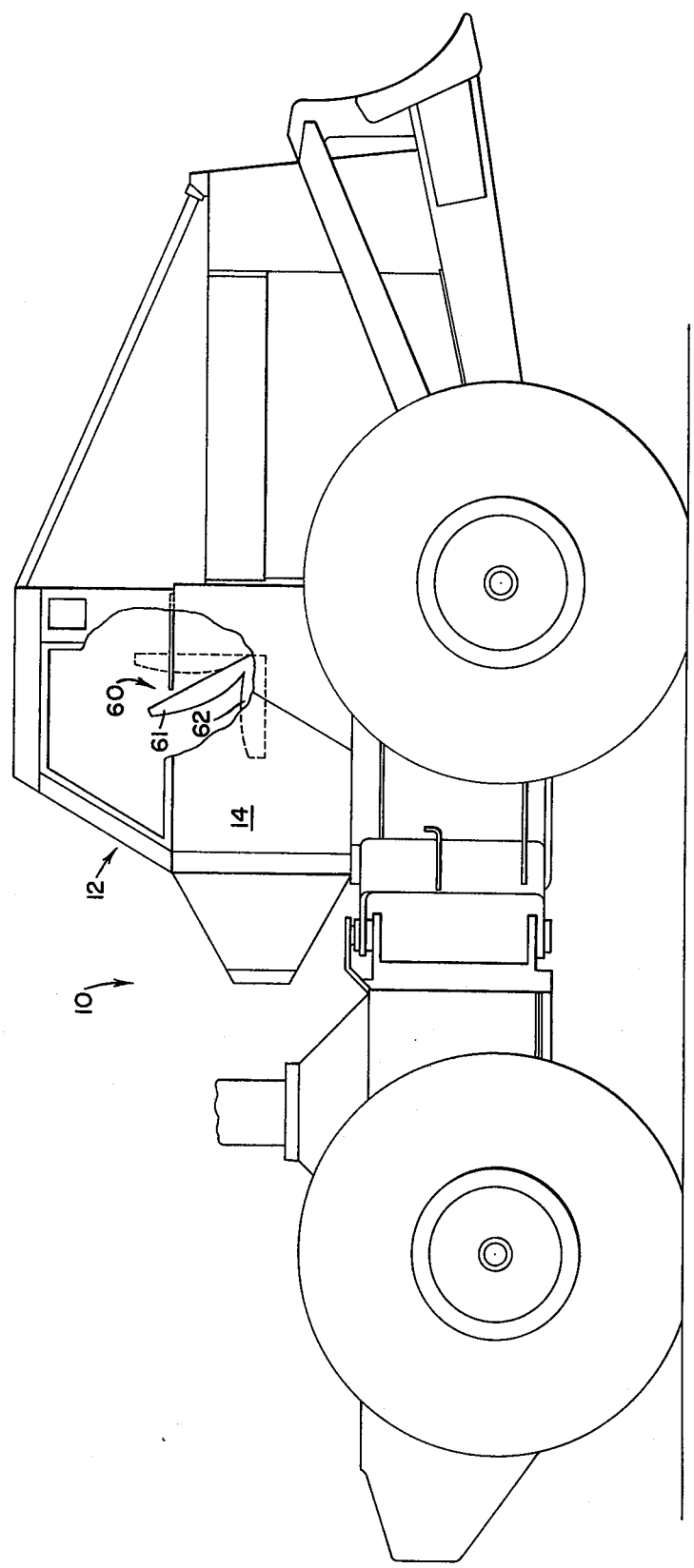
FIG. 1 is a side elevational view showing a vehicle embodying a latch mechanism constructed according to the principles of the present invention with parts of the vehicle being broken away to expose the latch mechanism.

Referring now to the drawing, therein is a partial showing of a vehicle 10 which is of a type intended to be used in forestry operations where the environment is hostile requiring the vehicle to be provided with a cab 12 constructed so as to be entirely enclosed when the vehicle is in operation. Specifically, the only opening to the cab is provided by a door 14 which may be locked shut in a conventional manner (not shown) when the vehicle 10 is not in use. While not shown, the cab 12 is provided with a windshield at its forward side and a further door similar to the door 14 may be provided at its right side. The rear side of the cab 12 is provided with a window 16 which is mounted to the framework of the cab in a manner permitting the window to be removed from the opening it occupies. Specifically, two identical window connections 18 are provided at spaced locations along the upper edge of the window and three identical connections 19 are provided at spaced locations at the lower edge of the window. It is here noted that a polycarbonate is used in making the window 16 and makes it virtually unbreakable.

The connections 18 each include a strap 20 fixed to and depending from a window frame or casing 22 so as to be inside the window 16. A resilient seal 24 is positioned between the strap 20 and the window 16. A bolt 26 projects through aligned apertures in the window 16 and in the strap 20 and includes a head which engages a washer 30 and holds the washer 30 against the outer surface of the window 16. The aperture in the window is oversized and has a nylon insert or bushing 32 located therein. It is to be noted that when the bottom of the window 16 is released from the casing 22, in a manner to be described below, outward prying forces exerted on the bottom of the window will cause the straps 20 to bend so as to permit the window 16 to assume an upwardly swung position.

Each of the connections 19 at the lower end of the window 16 include a strap 32 angled to provide an outer horizontal end section 34 extending outwardly from a vertical section 36 which engages the outer surface of the window 16. Each strap 32 further includes a horizontal section 38 extending beneath the window 16 and joining the vertical section 36 to a vertical section 40 engaged with an outer surface portion of the casing 22 and provided with a lug 42 having a square section 44, located in a complimentary opening in the casing 22, and a threaded end having a knob 46 received thereon for holding the strap 32 in place. When the knob 46 of each connection 19 is tight, the bottom end of the window 16 is held in tight engagement with a resilient seal 48 provided on the outer surface of the casing 22. It is to be noted that in cases of emergency, the bottom of the window 16 may be released by applying a downward force to the end sections 36 of the straps 32 to cause the latter to bend sufficiently to permit the window 16 to clear them.

For the purpose of preventing the window 16 from being removed by unauthorized persons when the vehicle 10 is not in use, there is provided a latch mechanism comprising a latch bar or arm 50 having one end pivotally connected, as by a pin 52, to a bracket 54 fixed to a central lower inner surface portion of the window 16. Fixed to an upper surface of the casing 22 at a location spaced forwardly of the bracket 54 when the window 16 is closed, as illustrated, is a vertical latch pin 56. One edge of the bar 50 is provided with a notch 58 located to receive the pin 56 when the bar 50 is disposed in a forwardly projecting operative position, as shown in solid lines in FIGS. 2 and 3. The length of the bar 50 is chosen such that it is necessary for an operator's seat 60 having a pivotable back 61 and a seating surface 60 to be unoccupied with its back 61 pivoted forwardly over the seating surface portion 62 to provide clearance for the bar 50. An elongated opening 64 is provided in the outer end of the bar 50 and is disposed for receiving a vertical pin 66 fixed to the casing 22 to one side of the latch pin 56 for the purpose of holding the bar 50 in a stored position, as shown in dashed lines in FIG. 3, it being noted that the connection at the pin 52 is sufficiently loose to permit limited upward movement of the bar 50 to permit the reception and removal of the pin 66 in and from the opening 64.

During normal operation of the vehicle 10, an operator usually is seated on the surface 62 of the seat 60 and the door 14 and window 16 of the cab 12 are usually closed. At this time, the latch bar 50 would be in its stored position, shown in dashed lines in FIG. 3, leaving the connections 18 and 19 as the sole means connecting the window 16 to the frame or casing 22.

Should the vehicle 10 then be involved in an accident resulting in the door 14 becoming jammed, the operator, assuming he is not disabled, may exit through the opening normally blocked by the window 16 by first removing the knobs 46 of the connections 19 so as to disconnect the straps 32 from the casing 22 and then by forcing the bottom of the window 16 outwardly so as to cause the straps 20 of the upper connections 18 to bend sufficiently to permit the operator to exit through the window opening.

If the operator is injured in the accident such that he is unable to remove the knobs 46, rescuers may reach him from outside the cab by first bending the straps 32 to free the bottom of the window and then by forcing the bottom of the window outwardly to cause the straps 20 of the upper connections 18 to bend sufficiently to allow access to the injured operator through the opening normally covered by the window 16.

When the operator is to leave the vehicle unattended for any appreciable length of time, he will leave the seat 60, tilt the seat back 61 forwardly and move the latch bar 50 to its operative position shown in solid lines shown in FIG. 2 and 3. The latch pin 56 will then be located in the notch 58 of the bar 50 so that the bar 50 and pin 56 cooperate to connect the window 16 to the casing 22. The operator will then leave the cab and lock the door 14. It will be appreciated then that even if the straps 32 of the connections 19 are bent free of the window 16, the latter will be held in place by the cooperating bar 50 and pin 56.

Upon returning to the cab 12, the operator will unlock the door 14 and enter the cab. Since the seat 60 is unusable with the back thereof tilted forwardly, the operator will be reminded to move the latch bar 50 back to its stored position. He can then resume normal operation of the vehicle 10.

I claim:

1. In a combination with a completely enclosed vehicle cab including a framework defining a window opening, a window disposed in a normal position closing said opening and held in said normal position by fastening means connected to the framework and capable of being forcibly distorted by a person located exteriorly of the cab for permitting movement of the window to an open position, and a seat mounted in the cab adjacent the window and having a seating surface for supporting an operator, a window latch comprising: a first locking part means movably mounted on one of said framework and window for movement between latched and stored positions, a second locking part means mounted on a different one of said framework and window than said first locking part is mounted, said first and second locking part means respectively including first and second cooperating means for establishing a connection between the framework and window when the first part means is in its latched position for preventing movement of the window to its open position, and for becoming disconnected for permitting opening of the window when the first part means is moved from its latched to its stored position; and said first part means including a portion so located relative to the seat that it prevents an operator from sitting on the seating surface only when the first part means is in said latched position.

2. The combination defined in claim 1 wherein said first part means is mounted on said window.

3. The combination defined in claim 2 wherein the window is a rear window disposed directly behind the seat and the seat is a type having a back tiltable between a normal upright position rearwardly of the seating surface and a forwardly tilted position partly overlying the seating surface and said portion of the first part means being dimensioned and shaped such as to require the seat back to be moved to its forwardly tilted position so as to permit movement of the first part means to said latched position, said portion of the first part means then occupying an area occupied by the seat back when the latter is in its normal upright position.

4. The combination defined in claim 3 wherein the first part means is a straight bar having one end pivotally attached to the window.

* * * * *